(12) United States Patent
Terashi et al.

(10) Patent No.: US 7,589,669 B2
(45) Date of Patent: Sep. 15, 2009

(54) POSITIONING SYSTEM, TERMINAL APPARATUS, TERMINAL APPARATUS CONTROL METHOD, TERMINAL APPARATUS CONTROL PROGRAM, AND COMPUTER READABLE RECORDING MEDIUM HAVING THE TERMINAL APPARATUS CONTROL PROGRAM RECORDED THEREIN

(75) Inventors: Yohei Terashi, Matsumoto (JP); Tomoyuki Kurata, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 34 days.

(21) Appl. No.: 11/451,350

(22) Filed: Jun. 13, 2006

(65) Prior Publication Data

US 2006/0290565 A1 Dec. 28, 2006

(30) Foreign Application Priority Data

Jun. 20, 2005 (JP) ............................. 2005-179399

(51) Int. Cl.
*G01S 5/14* (2006.01)
(52) U.S. Cl. ................................. 342/357.08
(58) Field of Classification Search ................. 342/461, 342/357.01–357.17; 455/440–441
See application file for complete search history.

(56) References Cited

U.S. PATENT DOCUMENTS

| 5,774,829 | A | 6/1998 | Cisneros et al. | |
|---|---|---|---|---|
| 6,731,955 | B2 * | 5/2004 | Hirano et al. | 455/562.1 |
| 7,027,815 | B2 * | 4/2006 | Sendonaris | 455/441 |

FOREIGN PATENT DOCUMENTS

| EP | 0838692 A1 | 4/1998 |
|---|---|---|
| JP | H06-120876 A | 4/1994 |
| JP | H08-271607 A | 10/1996 |
| JP | H09-166655 A | 6/1997 |
| JP | H11-083979 A | 3/1999 |
| JP | 2000-131415 A | 5/2000 |
| JP | 2004-364167 A | 12/2004 |
| WO | WO-03/089954 A | 10/2003 |

* cited by examiner

*Primary Examiner*—Thomas H Tarcza
*Assistant Examiner*—Nga X Nguyen
(74) *Attorney, Agent, or Firm*—Global IP Counselors, LLP

(57) ABSTRACT

The terminal apparatus has: positioning vector information generating means for generating positioning vector information which indicates a passing direction and a passing speed, based on the satellite signals used when each item of the current position information was generated; passing speed information generating means for generating passing speed information which indicates a passing speed of the terminal, based on the Doppler shift information and the transmitting frequency information; speed vector information generating means for generating speed vector information which indicates a passing direction and a passing speed of the terminal apparatus with respect to each of the communication base stations, based on the transmitting direction information and the passing speed information; combined vector information generating means for generating combined vector information which indicates a passing direction and a passing speed of the terminal apparatus, based on a plurality of the passing vector information; and current position information selecting means.

8 Claims, 6 Drawing Sheets

COMMUNICATION SIGNAL CS1 WHICH BASE STATION 20A SENDS

| TRANSMITTING DIRECTION INFORMATION 152h:NE | | |
|---|---|---|

COMMUNICATION SIGNAL CS2 WHICH BASE STATION 20B SENDS

| TRANSMITTING DIRECTION INFORMATION 152b:NW | | |
|---|---|---|

POSITIONING SYSTEM, TERMINAL APPARATUS, TERMINAL APPARATUS CONTROL METHOD, TERMINAL APPARATUS CONTROL PROGRAM, AND COMPUTER READABLE RECORDING MEDIUM HAVING THE TERMINAL APPARATUS CONTROL PROGRAM RECORDED THEREIN

This application claims the priorities benefit under 35 U.S.C. § 119 of Japanese Patent Application No. 2005-179399 filed on Jun. 20, 2005, which is hereby incorporated in its entirety by reference.

BACKGROUND

1. Technical Field

The present invention relates to a positioning system for carrying out positioning based on signals from positioning satellites; a terminal apparatus, a terminal apparatus control method; a terminal apparatus control program; and a computer readable recording medium having the terminal apparatus control program recorded therein.

2. Related Art

In the past, there has been a practically available positioning system for positioning a current position of a GPS receiver by utilizing, for example, a GPS (Global Positioning System) that is a satellite navigation system (JPA-2000-131415 (FIG. 1 or the like), for example).

The GPS receiver, for example, computes an observable GPS satellite positioned above in the sky, and, for example, selects a group of four GPS satellites. Then, the GPS receiver receives signals(hereinafter, referred to as satellite signals) from each GPS satellite with respect to each group of GPS satellites, and obtains a distance (hereinafter, referred to as a pseudo distance) between each GPS satellite and the GPS receiver by a difference(hereinafter, referred to as a delay time) between a time at which a satellite signal was transmitted from each GPS satellite and a time at which the satellite signal arrived at the GPS receiver. The GPS receiver is designed to compute a positioning result of a current position by using a position of each GPS satellite on a satellite orbit and the above described pseudo distance. The GPS receiver is design to compute a positioning result of each group of GPS satellites and to select and output a position determined to be close to a true position from among a plurality of positioning results.

In the meantime, a GPS satellite passes on its satellite orbit, and thus, a receiving direction and a pseudo distance of a satellite signal fluctuates regardless of whether the GPS receiver passes or stops. Thus, the GPS receiver may output a position in a direction different from an actual passing direction of the GPS receiver depending on a receiving state of a satellite signal or may output a position different from a previously output position regardless of the fact the GPS receiver has stopped ever since it has been previously positioned. In this case, there is a problem that an output position deviates from a true position, and precision deteriorates.

SUMMARY

Therefore, an advantage of some aspects of the invention is to provide a positioning system, a terminal apparatus, a terminal apparatus control method, a terminal apparatus control program, and a computer readable recording medium having the terminal apparatus control program recorded therein, which are capable of selecting a positioning location with high precision corresponding to a passing state of the terminal apparatus.

According to a first aspect of the invention, there is provided a positioning system, comprising: a terminal apparatus for receiving satellite signals which are signals from positioning satellites, and a plurality of communication base stations which are communicable with the terminal apparatus and which are situated at fixed positions, wherein the communication base station has communication signal transmitting means for transmitting a communication signal including transmitting direction information which indicates a transmitting direction, and the terminal apparatus has: transmitting frequency information storage means for storing transmitting frequency information indicating a transmitting frequency of a communication electric wave having the communication signal loaded thereon; current position information generating means for generating a plurality of current position information indicating a current position by positioning based on the satellite signals; positioning vector information generating means for generating positioning vector information which indicates a passing direction and a passing speed of the terminal apparatus, based on the satellite signals used when each item of the current position information was generated; communication signal receiving means for receiving the communication signal; transmitting direction information obtaining means for obtaining the transmitting direction information from the communication signal; receiving frequency information generating means for generating receiving frequency information which indicates a receiving frequency of the communication electric wave; Doppler shift information generating means for generating Doppler shift information which indicates a Doppler shift of the communication electric wave of each of the communication base stations, based on the receiving frequency information and the transmitting frequency information; passing speed information generating means for generating passing speed information which indicates a passing speed of the terminal apparatus with respect to each of the communication base stations, based on the Doppler shift information and the transmitting frequency information; speed vector information generating means for generating speed vector information which indicates a passing direction and a passing speed of the terminal apparatus with respect to each of the communication base stations, based on the transmitting direction information and the passing speed information; combined vector information generating means for generating combined vector information which indicates a passing direction and a passing speed of the terminal apparatus, based on a plurality of the passing vector information; and current position information selecting means for selecting one of the plurality of the current position information, based on the positioning vector information and the combined vector information.

According to a configuration of the first aspect of the invention, the terminal apparatus can generate the positioning vector information based on the satellite signals used when each item of the current position information was generated, because it has the positioning vector information generating means. As described later, the terminal apparatus uses the positioning vector information as basic information for selecting the current position information.

In addition, the terminal apparatus can generate speed vector information indicating a passing direction and a passing speed of the terminal apparatus with respect to each of the communication base stations, because it has the speed vector information generating means. The speed vector information is information indicating a relative passing direction and a passing speed of the terminal apparatus with respect to each of the communication base stations.

The terminal apparatus can generate combined vector information indicating a passing direction and a passing speed of the terminal apparatus, based on a plurality of the positioning vector information, because it has the combined vector information generating means.

Further, the terminal apparatus can select one current position information from among a plurality of the current position information, based on the positioning vector information and the combined vector information, because it has the current position information selecting means.

A passing direction indicated in the speed vector information is based on the transmitting direction information included in the communication signal from each of the communication base stations situated at fixed positions. In addition, each of the communication base stations is situated at the fixed position, and thus, the passing speed indicated in the speed vector information reflects only the passing speed of the terminal apparatus. Thus, in a course of generating the speed vector information, the only factor of an error is the passing speed of the terminal apparatus. Thus, it can be said that the speed vector information is highly precise. In addition, the combined vector information is highly precise because the information is generated based on the speed vector information.

Therefore, the positioning vector information having high correlativity with the combined vector information is more precise than the positioning vector information having low correlativity with the combined vector information.

This implies that a receiving state of the satellite signals was good, the signals being used when the positioning vector information having large correlativity with the combined vector information was generated. In addition, the positioning precision is high when it is based on the satellite signals in the case where the receiving state is good. Thus, it can be said that the current position information is highly precise, the information being generated based on the satellite signals used when the positioning vector information having large correlativity with the combined vector information was generated.

In this regard, the terminal apparatus can select the current position information with high precision reflecting a passing state of the terminal apparatus because it selects the current position information based on the combined vector information.

In this manner, according to the positioning system, it is possible to select a positioning location with high precision that corresponds to the passing state of the terminal apparatus.

According to a second aspect of the invention, the above-described advantage is attained by a terminal apparatus communicable with a communication base station having communication signal transmitting means for transmitting a communication signal including transmitting direction information which indicates a transmitting direction, the terminal apparatus comprising: transmitting frequency information storage means for storing transmitting frequency information indicating a transmitting frequency of a communication electric wave having the communication signal loaded thereon; current position information generating means for generating a plurality of current position information indicating current positions by positioning based on a satellite signals which are signals from positioning satellites; positioning vector information generating means for generating positioning vector information which indicates a passing direction and a passing speed of the terminal apparatus, based on the satellite signals used when each item of the current position information has been generated; communication signal receiving means for receiving the communication signal; transmitting direction information obtaining means for obtaining the transmitting direction information from the communication signal; receiving frequency information generating means for generating receiving frequency information which indicates a receiving frequency of the communication electric wave; Doppler shift information generating means for generating Doppler shift information which indicates a Doppler shift of the communication electric wave of each of the communication base stations, based on the receiving frequency information and the transmitting frequency information; passing speed information generating means for generating passing speed information which indicates a passing speed of the terminal apparatus with respect to each of the communication base stations, based on the Doppler shift information and the transmitting frequency information; speed vector information generating means for generating speed vector information which indicates a passing direction and a passing speed of the terminal apparatus with respect to each of the communication base stations, based on the transmitting direction information and the passing speed information; combined vector information generating means for generating combined vector information which indicates a passing direction and a passing speed of the terminal apparatus, based on a plurality of the speed vector information; and current position information selecting means for selecting one of the plurality of the current position information, based on the positioning vector information and the combined vector information.

According to a configuration of the second aspect of the invention, as in the configuration of the first aspect of the invention, it is possible to select a positioning location with high precision that corresponds to the passing state of the terminal apparatus.

According to a third aspect of the invention, in the configuration of the second aspect of the invention, there is provided a terminal apparatus, wherein the current position information selecting means selects the current position information that corresponds to the positioning vector information having the largest correlativity with the combined vector information.

According to the configuration of the third aspect of the invention, the current position information selecting means can reliably select a positioning location that corresponds to the passing state of the terminal apparatus because it can select the current position information that corresponds to the positioning vector information having the largest correlativity with the combined vector information.

According to a fourth aspect of the invention, in a configuration of either of the second and third inventions, there is provided a terminal apparatus, wherein the current position information selecting means is configured to select the current position information that corresponds to the positioning vector information indicating the slowest passing speed in the case where the combined vector information indicates that the terminal apparatus has stopped.

According to the configuration of the fourth aspect of the invention, the current position information selecting means can select the current position information that corresponds to the positioning vector information indicating the slowest passing speed in the case where the combined vector information indicates that the terminal apparatus has stopped. Thus, it is possible to prevent selection of the current position information that corresponds to the positioning vector information indicating that the terminal apparatus is moving at a high speed in spite of the fact that the terminal apparatus has stopped.

According to a fifth aspect of the invention, in a configuration of either of the second and third aspects of the invention, there is provided a terminal apparatus, wherein the current position information selecting means is configured to reselect the previously selected current position information in the case where the combined vector information indicates that the terminal apparatus has stopped.

According to the configuration of the fifth aspect of the invention, the current position information selecting means can reselect the previously selected current position information in the case where the combined vector information indicates that the terminal apparatus has stopped. Thus, it is possible to prevent selection of the current position information indicating a position different from a position indicated in the previously selected current position information despite the fact that the terminal apparatus has stopped.

According to a sixth aspect of the invention, the above-described advantage is attained by a terminal apparatus control method, comprising the steps of: generating a plurality of current position information indicating a current position by positioning based on satellite signals which are signals from positioning satellites, by means of a terminal apparatus communicable with a communication base station having communication signal transmitting means for transmitting a communication signal including transmitting direction information which indicates a transmitting direction; generating positioning vector information which indicates a passing direction and a passing speed of the terminal apparatus, based on the satellite signals used when each item of the current position information was generated, by means of the terminal apparatus; receiving the communication signal by means of the terminal apparatus; obtaining the transmitting direction information from the communication signal by means of the terminal apparatus; generating receiving frequency information which indicates a receiving frequency of the communication electric wave by means of the terminal apparatus; generating Doppler shift information which indicates a Doppler shift of the communication electric wave of each of the communication base stations, based on the receiving frequency information and the transmitting frequency information which indicates a frequency of the communication electric wave, by means of the terminal apparatus; generating passing speed information which indicates a passing speed of the terminal apparatus with respect to each of the communication base stations, based on the Doppler shift information and the transmitting frequency information by means of the terminal apparatus; generating speed vector information which indicates a passing direction and a passing speed of the terminal apparatus with respect to each of the communication base stations, based on the transmitting direction information and the passing speed information by means of the terminal apparatus; generating combined vector information which indicates a passing direction and a passing speed of the terminal apparatus, based on a plurality of the passing vector information by means of the terminal apparatus; and selecting one of the plurality of the current position information, based on the positioning vector information and the combined vector information by means of the terminal apparatus.

According to the configuration of the sixth aspect of the invention, as in the configuration of the second aspect of the invention, it is possible to select a positioning location with high precision that corresponds to the passing state of the terminal apparatus.

According to a seventh aspect of the invention, the above-described advantage is attained by a terminal apparatus control program causing a computer to execute the steps of: generating a plurality of current position information indicating a current position by positioning based on a satellite signals which are signals from positioning satellites, by means of a terminal apparatus communicable with a communication base station having communication signal transmitting means for transmitting a communication signal including transmitting direction information which indicates a transmitting direction; generating positioning vector information which indicates a passing direction and a passing speed of the terminal apparatus, based on the satellite signals used when each item of the current position information was generated, by means of the terminal apparatus; receiving the communication signal by means of the terminal apparatus; obtaining the transmitting direction information from the communication signal by means of the terminal apparatus; generating receiving frequency information which indicates a receiving frequency of the communication electric wave by means of the terminal apparatus; generating Doppler shift information which indicates a Doppler shift of the communication electric wave of each of the communication base stations, based on the receiving frequency information and a transmitting frequency information which indicates a frequency of the communication electric wave, by means of the terminal apparatus; generating passing speed information which indicates a passing speed of the terminal apparatus with respect to each of the communication base stations, based on the Doppler shift information and the transmitting frequency information by means of the terminal apparatus; generating speed vector information which indicates a passing direction and a passing speed of the terminal apparatus with respect to each of the communication base stations, based on the transmitting direction information and the passing speed information by means of the terminal apparatus; generating combined vector information which indicates a passing direction and a passing speed of the terminal apparatus, based on a plurality of the speed vector information by means of the terminal apparatus; and selecting one of the plurality of the current position information, based on the positioning vector information and the combined vector information by means of the terminal apparatus.

According to an eighth aspect of the invention, the above-described advantage is attained by a computer readable recording medium having recorded therein a terminal apparatus control program which causes a computer to execute the steps of: generating a plurality of current position information indicating a current position by positioning based on a satellite signals which are signals from positioning satellites, by means of a terminal apparatus communicable with a communication base station having communication signal transmitting means for transmitting a communication signal including transmitting direction information which indicates a transmitting direction; generating positioning vector information which indicates a passing direction and a passing speed of the terminal apparatus, based on the satellite signals used when each item of the current position information was generated, by means of the terminal apparatus; receiving the communication signal by means of the terminal apparatus; obtaining the transmitting information from the communication signal by means of the terminal apparatus; generating receiving frequency information which indicates a receiving frequency of the communication electric wave by means of the terminal apparatus; generating Doppler shift information which indicates a Doppler shift of the communication electric wave of each of the communication base stations, based on the receiving frequency information and a transmitting frequency information which indicates a frequency of the communication electric wave by means of the terminal apparatus; generating passing speed information which indicates a passing speed of the terminal apparatus with respect to each of the communication base stations, based on the Doppler shift information and the transmitting frequency information, by means of the terminal apparatus; generating speed vector information which indicates a passing direction and a passing speed of the terminal apparatus with respect to each of the communication base stations, based on the transmitting direction information and the passing speed information by means of the terminal apparatus; generating combined vector information which indicates a passing direction and a passing speed of the terminal apparatus, based on a plurality of the passing vector information by means of the terminal apparatus; and selecting one of the plurality of the current position information, based on the positioning vector information and the combined vector information by means of the terminal apparatus.

BRIEF DESCRIPTION OF THE DRAWINGS

The invention will be described with reference to the accompanying drawings, wherein like numbers reference like elements.

FIG. 5 is a diagram showing an example of a communication signal;

FIG. 7 is a diagram showing an example of a positioning location or the like;

FIG. 8 is a diagram showing an example of a speed vector or the like; and

DESCRIPTION OF EXEMPLARY EMBODIMENTS

Hereinafter, with reference to the drawings, the exemplary embodiment(s) of this invention will be described in detail.

The following embodiments are given various limitations that are preferable technically because they are the exemplary specific examples of the invention; however, the scope of the invention is not limited to these aspects unless there is a particular description to limit the invention in the following descriptions.

Figure 1:
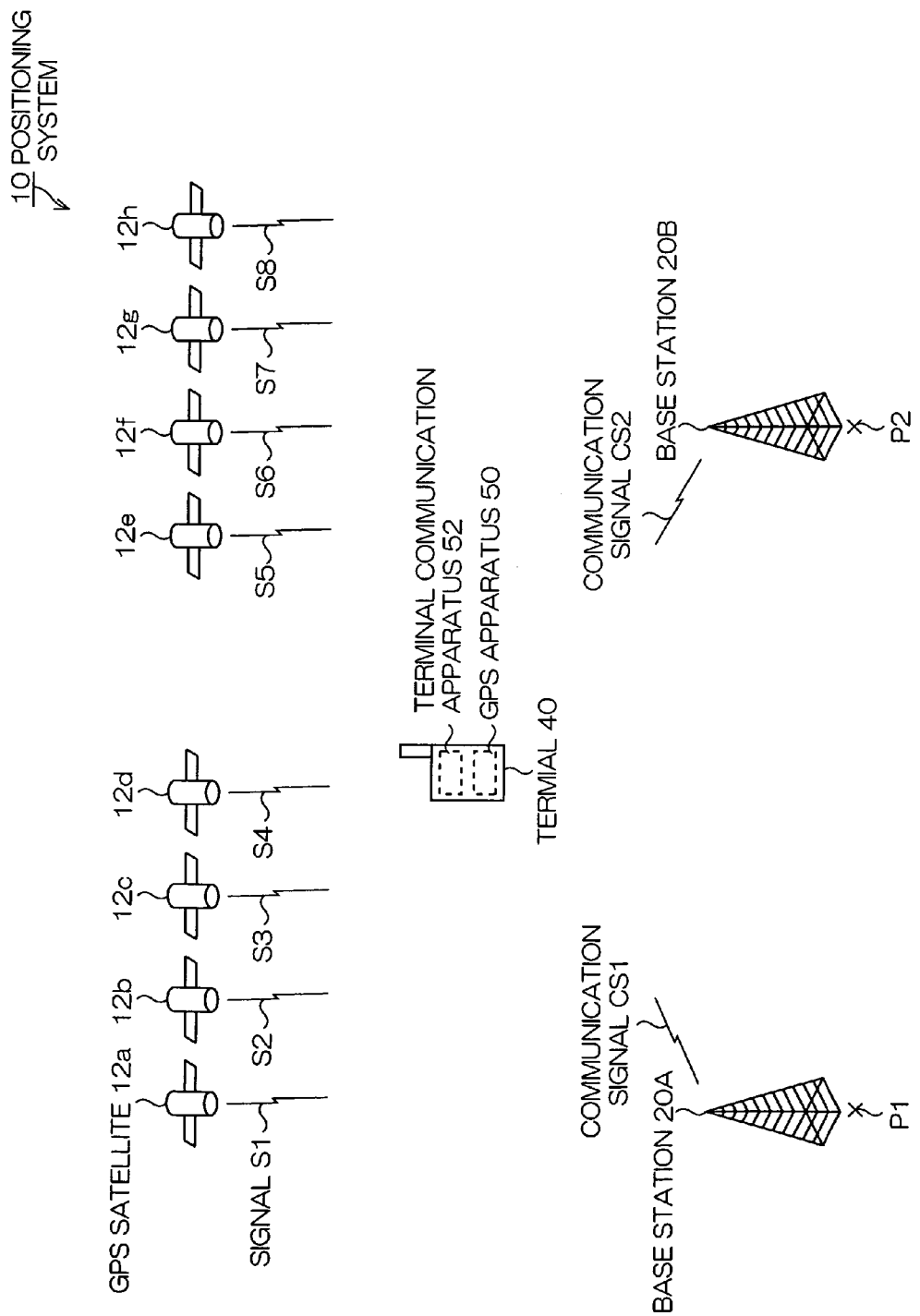
FIG. 1 is a schematic diagram showing a positioning system according to an embodiment of the invention.

FIG. 1 is a schematic diagram showing a positioning system 10 according to an embodiment of the invention.

As shown in FIG. 1, the positioning system 10 has a terminal 40. The terminal 40 has a GPS apparatus 50. By this GPS apparatus 50, signals S1, S2, S3, S4, S5, S6, S7, and S8 can be received from GPS, satellites 12a, 12b, 12c, 12d, 12e, 12f, 12g, and 12h. The GPS satellite 12a or the like are examples of positioning satellites, and the signal S1 or the like are examples of satellite signals.

The terminal 40 has a terminal communication device 52, and can receive communication signals CS1 and CS2 from base stations 20A and 20B described later.

The terminal 40, for example, includes a portable cellular phone, PHS (Personal Handy-phone System), PDA (Personal Digital Assistance) or the like, but is not limited thereto.

The positioning system 10, in addition, has base stations 20A and 20B. The base station 20A is situated at a fixed position P1, and the base station 20B is situated at a fixed position P2. The base stations 20A and 20B can communicate with the terminal 40 by transmitting communication signals CS1 and CS2, respectively. The fixed positions P1 and P2 are examples of the fixed positions, and the base stations 20A and 20B are, as a whole, an example of communication base stations.

The base stations 20A and 20B are, for example, communication base stations of a potable cellular phone, communication base stations of PHS, or communication base stations of PDA or the like, but are not limited thereto.

The base station 20A or the like may be provided in plurality and, for example, three or more base stations may be provided.

Unlike the present embodiment, the number of GPS satellites 12a or the like is not limited to eight, but may be seven or less and may be nine or more.

Primary Hardware Configuration of Base Station 20A

Figure 2:
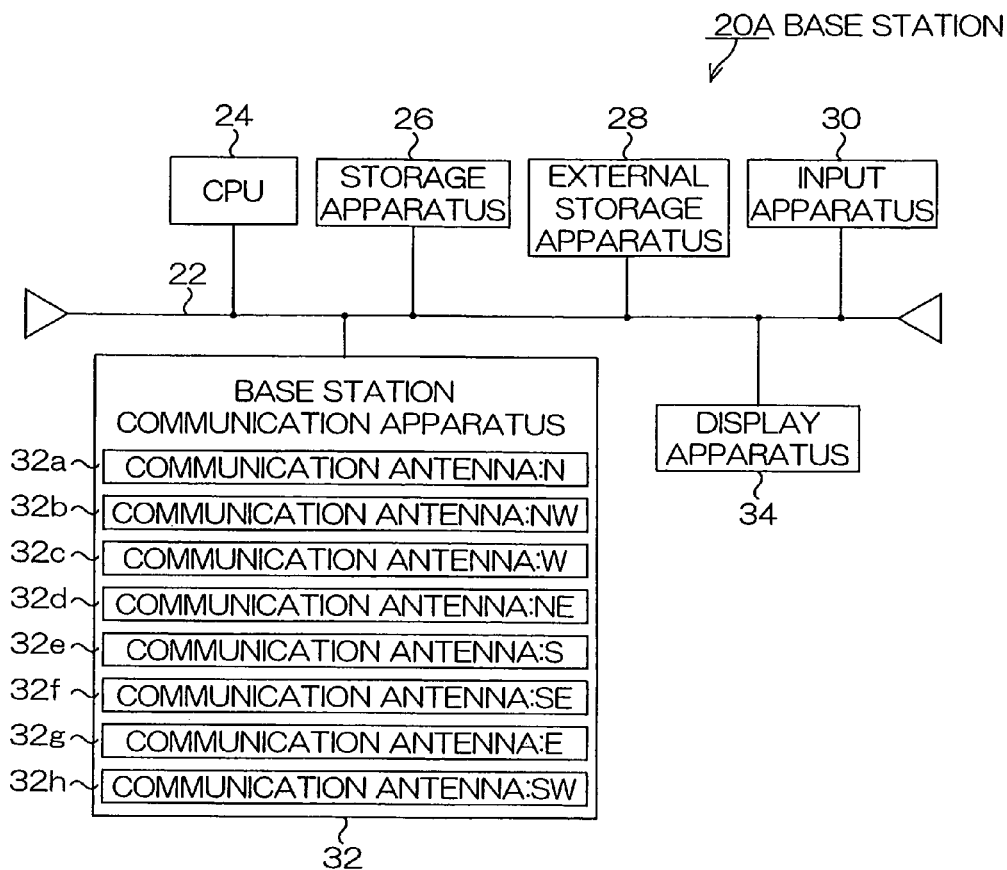
FIG. 2 is a schematic diagram showing a primary hardware configuration of a base station.

FIG. 2 is a schematic diagram showing a primary hardware configuration of the base station 20A.

A primary hardware configuration of the base station 20B is similar to that of the base station 20A. An explanation thereof is not provided here.

As shown in FIG. 2, the base station 20A has a computer, and the computer has a bus 22.

CPU (Central Processing Unit) 24, a storage apparatus 26, and an external storage apparatus 28 or the like are connected to the bus 22. The storage apparatus 26, for example, is RAM (Random Access Memory), ROM (Read Only Memory) or the like. The external storage apparatus 28 is HDD (Hard Disk Drive), for example.

In addition, to this bus 22, there are connected: an input apparatus 30 for receiving a variety of information or command input; a base station communication device 32 for transmitting and receiving a signal to/from the terminal 40; and a display device 34 for displaying a variety of information.

As shown in FIG. 2, the base station communication device 32 has communication antennas 32a, 32b, 32c, 32d, 32e, 32f, 32g, and 32h. The communication antenna 32a is designed to transmit a communication signal CS1 from a position P1 of the base station 20A to north. Similarly, the communication antenna 32b is designed to transmit the communication signal CS1 to northwest; the communication antenna 32c to west; the communication antenna 32d to southwest; the communication antenna 32e to south; the communication antenna 32f to southeast; the communication antenna 32g to east; the communication antenna 32h to northeast.

Primary Hardware Configuration of Terminal 40

Figure 3:
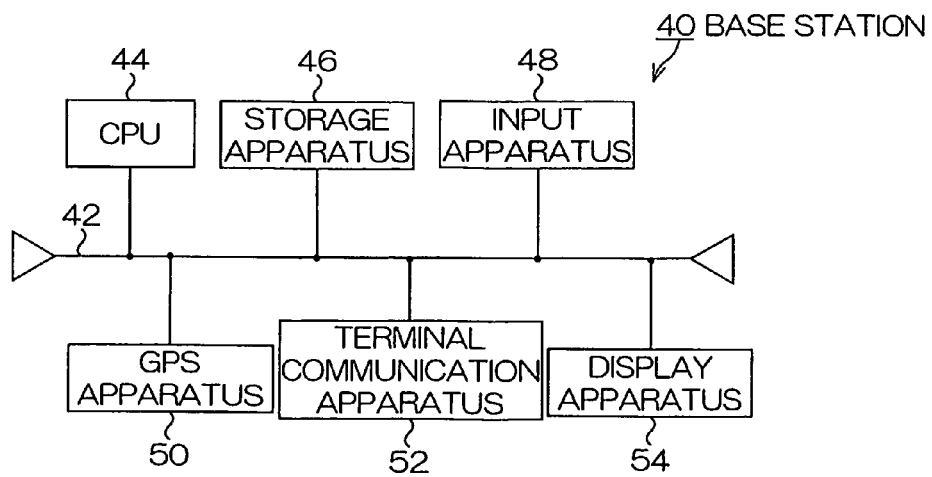
FIG. 3 is a schematic diagram showing a primary hardware configuration of a terminal.

FIG. 3 is a schematic diagram showing a primary hardware configuration of the terminal 40.

As shown in FIG. 3, the terminal 40 has a computer, and the computer has a bus 42.

CPU 44, a storage apparatus 46, an input apparatus 48, a GPS apparatus 50, a terminal communication device 52, and a display device 54 are connected to the bus 42.

The terminal 40 receives communication signals CS1 and CS2 (refer to FIG. 1) from base stations 20A and 20B by means of the terminal communication device 52. That is, the terminal communication device 52 is an example of communication signal receiving means.

Primary Software Configuration of Base Station 20A)

Figures 4, 5A, 5B:
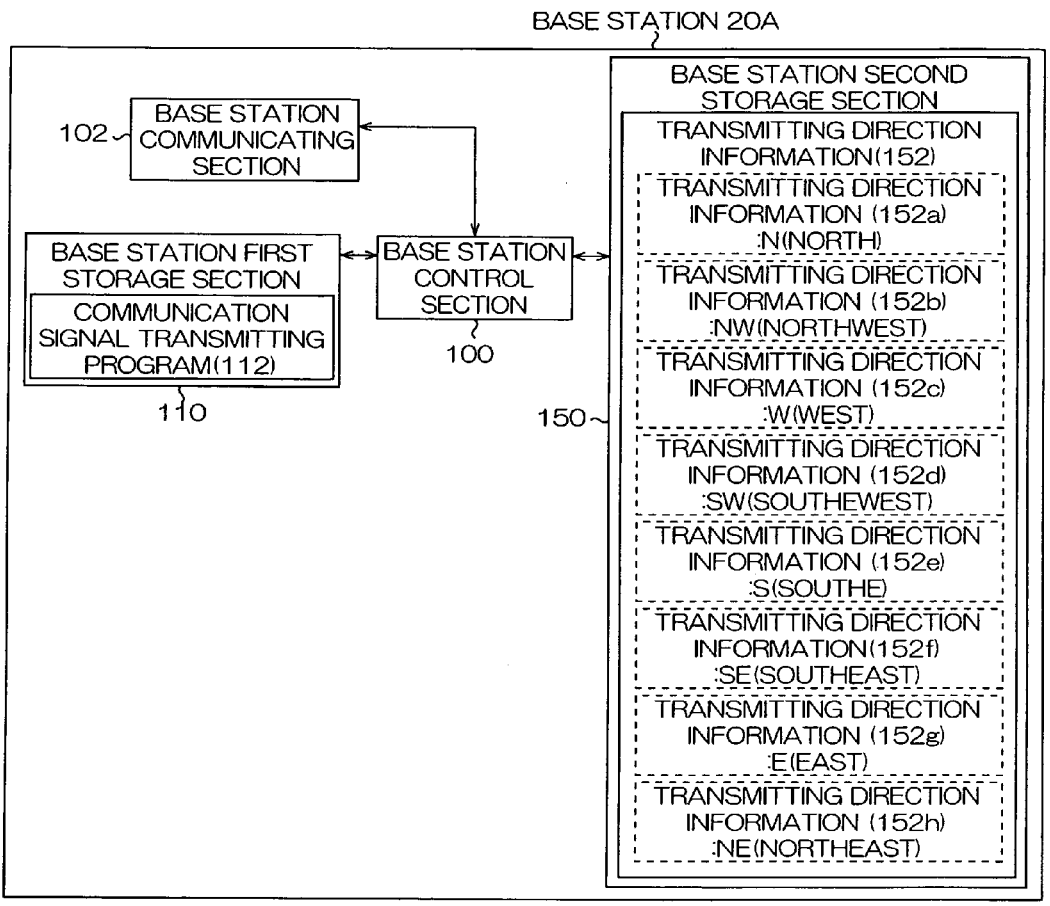
FIG. 4 is a schematic diagram showing a primary software configuration of a base station.

FIG. 4 is a schematic diagram showing a primary software configuration of the base station 20A.

FIG. 5 is a schematic diagram showing an example of the communication signal CS1 or the like transmitted from the base station 20A. A primary software configuration of the base station 20B is similar to that of the base station 20A. An explanation thereof is not provided here.

As shown in FIG. 4, the base station 20A has: a base station control section 100 for controlling each section; a base station communicating section 102 that corresponds to the base station communication device 32 shown in FIG. 2; a base station storage section 110 for storing a variety of programs; and a base station second storage section 150 for storing a variety of information.

As shown in FIG. 4, the base station 20A stores transmitting direction information 152 in the base station second storage section 150. The transmitting direction information 152 is information indicating a transmitting direction of the communication signal CS1. The transmitting direction information 152 is composed of a plurality of transmitting direction information 152a to 152h each indicating a specific transmitting direction. The transmitting direction information 152a indicates north that is a transmitting direction of the communication signal CS1 transmitted from the communication antenna 32a. Similarly, items of transmitting direction information 152b to 152h correspond to transmitting directions of the communication signal CS1 transmitted from the communication antennas 32b to 32h, respectively. The transmitting direction information 152 is an example of transmitting direction information.

As shown in FIG. 4, the base station 20A stores a communication signal transmitting program 112 in the base station first storage section 110. The communication signal transmitting program 112 is a program for the base station control section 100 to transmit the communication signal CS1 including the transmitting direction information 152a or the like. That is, the communication signal transmitting program 112 and the base station control section 100 are, as a whole, an example of communication signal transmitting means.

For example, the base station control section 100 is designed to transmit the communication signal CS1 including the transmitting direction information 152h which indicates northwest, as shown in FIG. 5(a) from communication antenna 32h. As shown in FIG. 5(a), the communication signal CS1 is composed of a frame for storing in formation, and the transmitting direction information 152h is stored in the frame.

Similarly, the base station control section 100 is designed to transmit the communication signal CS1 including a respective one of the items of the transmitting direction information 152a to 152g indicating north (N) to east (E) from the communication antennas 32a to 32g.

Primary Software Configuration of Terminal 40

Figure 6:
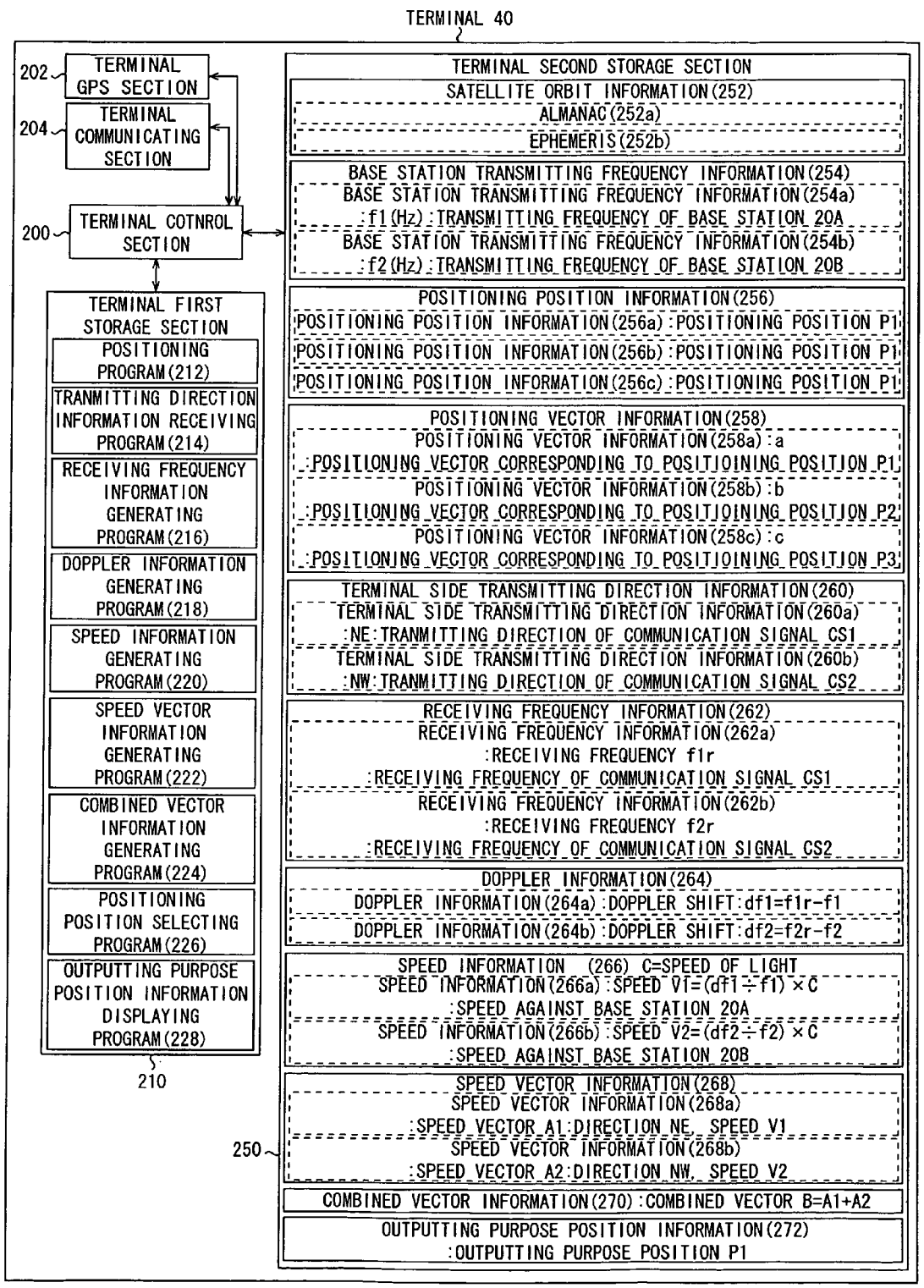
FIG. 6 is a schematic diagram showing a primary software configuration of a terminal.

FIG. 6 is a schematic diagram showing a primary software configuration of the terminal 40.

Figure 7:
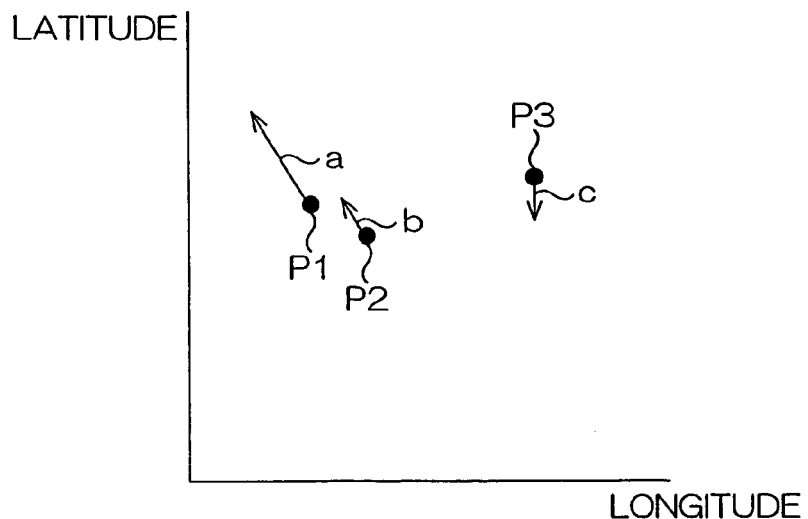

FIG. 7 is a diagram showing an example of a positioning location P1 or the like.

Figure 8:
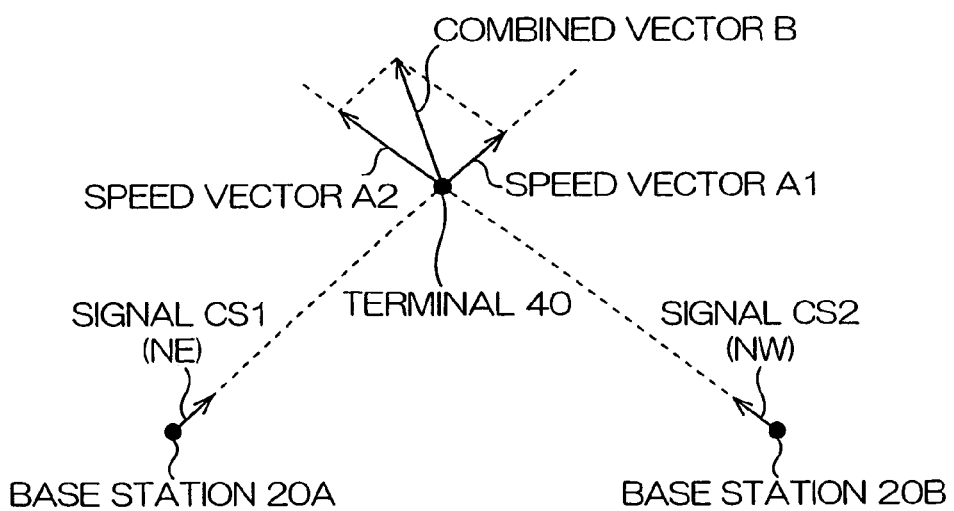

FIG. 8 is a view showing an example of a positioning vector A1 or the like.

As shown in FIG. 6, the terminal 40 has: a terminal control section 200 for controlling each section; a terminal GPS section 202 that corresponds to a GPS apparatus 50 shown in FIG. 3; a terminal communicating section 204 that corresponds to a terminal communication device 52; a terminal first storage section 210 for storing a variety of programs; and a terminal second storage section 250 for storing a variety of information.

As shown in FIG. 6, the terminal 40 stores satellite orbit information 252 in the terminal second storage section 250. The satellite orbit information 252 includes an Almanac 252a indicating general orbits of all the GPS satellites 12a or the like and an Ephemeris 252b indicating a precise orbit of each of the GPS satellites 12a and the like. The terminal 40 obtains the Almanac 252a and the Ephemeris 252b by receiving and decoding signals S1 and the like from the GPS satellites 12a and the like.

The terminal 40 uses the satellite orbit information 252 for positioning based on the signals S1 and the like.

As shown in FIG. 6, the terminal 40 stores base station transmitting frequency information 254 in the terminal second storage section 250. The base station transmitting frequency information 254 is information indicating a transmitting frequency f1 of a communication electric wave having loaded thereon the communication signal CS1 from the base station 20A and a transmitting frequency f2 of a communication electric wave having loading thereon the communication signal CS1 from the base station 20B. The transmitting frequency f1 or the like is a frequency obtained when the communication electric wave having the communication signal CS1 or the like loaded thereon is transmitted from the base stations 20A and the like.

The base station transmitting frequency information 254 is an example of transmitting frequency information, and the terminal second storage section 250 is an example of transmitting frequency information storage means.

As shown in FIG. 6, the terminal 40 stores a positioning program 212 in the terminal first storage section 210. The positioning program 212 is a program for the terminal control section 200 to generate a plurality of positioning position information 256a or the like indicating a current position by positioning based on a signal S1 or the like. The positioning position information 256a or the like are examples of current position information. In addition, the positioning program 212 and the terminal control section 200 are, as a whole, an example of current position information generating means.

The terminal control section 200, for example, positions a current location and generates the positioning position information 256a or the like, based on four signals S1 or the like received by the terminal GPS section 202. Here, if the terminal control section 200 selects different satellite groups, positioning results may also be different from each other. For example, the positioning position information 256a indicating a positioning location P1 (refer to FIG. 7) is generated by positioning based on signals S1, S2, S3, and S4; positioning position information 256b indicating a positioning location P2 (refer to FIG. 7) is generated by positioning based on signals S2, S3, S4, and S5; positioning position information 256c indicating a positioning location P3 (refer to FIG. 7) is generated by positioning based on signals S5, S6, S7, and S8;

The terminal control section 200, as described later, selects one of the items of positioning position information 256a or the like, and displays the selected item on the display device 54 (refer to FIG. 3).

The terminal control section 200 stores the generated positioning position information 256a or the like in the terminal second storage section 250.

The above described positioning program 212 is a program for the terminal control section 200 to generate positioning vector information 258a indicating a passing direction and a passing speed of the terminal 40, based on a signal S1 or the like produced when the positioning position information 256a or the like has been generated. The positioning vector information 258a or the like is an example of positioning vector information. In addition, the positioning program 212 and the terminal control section 200 are, as a whole, an example of positioning vector information generating means.

For example, the terminal control section 200 generates positioning vector information 258a indicating a vector "a" (refer to FIG. 7), based on a Doppler shift or the like of a frequency of an electric wave having loaded thereon signals S1, S2, S3, and S4 used when the positioning position information 256a was generated (refer to paragraphs [0016] to [0018] of JP A-8-68651, for example). Similarly, the terminal control section 200 generates positioning vector information 258b indicating a vector "b," based on a Doppler shift or the like of a frequency of an electric wave having loaded therein a signal S2 or the like used when the positioning position information 256b was generated. Then, the terminal control section 200 generates positioning vector information 258c indicating a vector "c" (refer to FIG. 7), based on a Doppler shift or the like of a frequency of a signal S5 or the like used when the positioning position information 256c was generated.

The terminal control section 200 stores the generated positioning vector information 258a or the like in the terminal second storage section 250.

As shown in FIG. 6, the terminal 40 stores a transmitting direction information obtaining program 214 in the terminal first storage section 210. The transmitting direction information obtaining program 214 is a program for the terminal control section 200 to obtain transmitting direction information 152a or the like (refer to FIG. 4) from a communication signal CS1 or the like. That is, the transmitting direction information obtaining program 214 and the terminal control section 200 are, as a whole, an example of transmitting direction information obtaining means.

The terminal control section 200 stores the obtained transmitting direction information 152a or the like as terminal side transmitting direction information 260a or the like in the terminal second storage section 250.

As shown in FIG. 6, the terminal 40 stores a receiving frequency information generating program 216 in the terminal first storage section 210. The receiving frequency information generating program 216 is a program for the terminal control section 200 to generate receiving frequency information 262a or the like indicating a receiving frequency of a communication electric wave having loaded thereon a communication signal CS1 or the like. The receiving frequency information 262a or the like are examples of receiving frequency information. In addition, the receiving frequency information generating program 216 and the terminal control section 200 are, as a whole, an example of receiving frequency information generating means.

Specifically, the terminal control section 200 measures a frequency of a communication electric wave having loaded thereon a communication signal CS1 received by a terminal communicating section 204, and generates receiving frequency information 262a indicating a receiving frequency f1r. Similarly, the terminal control section 200 measures a frequency of a communication electric wave having loaded thereon a communication signal CS2 received by the terminal communicating section 204, and generates receiving frequency information 262b indicating a receiving frequency f2r.

The terminal control section 200 stores the generated receiving frequency information 262a or the like in the terminal second storage section 250.

As shown in FIG. 6, the terminal 40 stores a Doppler information generating program in the terminal first storage section 210. The Doppler information generating program 218 is a program for the terminal control section 200 to generate Doppler information 264a or the like indicating a Doppler shift of a frequency of a communication electric wave for each of the base stations 20A and the like based on the receiving frequency information 262 and the base station transmitting frequency information 254. This Doppler information 264a or the like are examples of Doppler shift information. In addition, the Doppler information generating program 218 and the terminal control section 200 are, as a whole, an example of Doppler shift information generating means.

Specifically, the terminal control section 200 subtracts a transmitting frequency f1 indicated in base station transmitting frequency information 254a from a receiving frequency f1r indicated in receiving frequency information 262a with respect to the base station 20A, and generates Doppler information 264a indicating a Doppler shift df1. Similarly, the terminal control section 200 subtracts a transmitting frequency f2 indicated in base station transmitting frequency information 254b from a receiving frequency f2r indicated in receiving frequency information 262b with respect to the base station 20B, and generates Doppler information 264b indicating a Doppler shift df2.

As shown in FIG. 6, the terminal 40 stores a speed information generating program 220 in the terminal first storage section 210. The speed information generating program 220 is a program for the terminal control section 200 to generate speed information 266 indicating a passing speed of the terminal 40 with respect to each of the base stations 20A and the like, based on Doppler information 264 and base station transmitting frequency information 254. The speed information 266 is an example of passing speed information. In addition, the speed information generating program 220 and the terminal control section 200 are, as a whole, an example of passing speed information generating means.

Specifically, the terminal control section 200 computes a passing speed V1 of the terminal 40 with respect to the base station 20A based on a formula V1=(fd1/f1)×C, and generates speed information 266a. In the above described formula, uppercase letter C denotes a light speed. Similarly, the terminal control section 200 generates speed information 266b with respect to the base station 20B.

The terminal control section 200 stores items of the generated speed information 266a and 266b in the terminal second storage section 250.

As shown in FIG. 6, the terminal 40 stores a positioning vector information generating program 222 in the terminal first storage section 210. The positioning vector information generating program 222 is a program for the terminal control section 200 to generate speed vector information 268 indicating a passing direction and a passing speed of the terminal 40 with respect to each of the base stations 20A and the like based on the terminal side transmitting direction information 260 and the speed in formation 266. The speed vector information 268 is an example of speed vector information. Then, the positioning vector information generating program 222 and the terminal control section 200 are, as a whole, an example of positioning vector information generating means.

Specifically, the terminal control section 200 generates positioning vector information 268a indicating a speed vector A1 (refer to FIG. 8) of the terminal 40 with respect to the base station 20A, based on transmitting direction information 260a and speed information 266a. Similarly, the terminal control section 200 generates speed vector information 268b indicating a speed vector A2 (refer to FIG. 8) of the terminal 40 with respect to the base station 20B, based on transmitting direction information 260b and speed information 266b.

The terminal control section 200 stores the generated speed vector information 268a or the like in the terminal second storage section 250.

As shown in FIG. 6, the terminal 40 stores a combined vector information generating program 224 in the terminal first storage section 210. The combined vector information generating program 224 is a program for the terminal control section 200 to generate combined vector information 270 indicating a passing direction and a passing speed of the terminal 40, based on a plurality of speed vector information 268a or the like. The combined vector information 270 is an example of combined vector information. In addition, the combined vector information generating program 224 and the terminal control section 200 are, as a whole, an example of combined vector information generating means.

Specifically, the terminal 40 combines a positioning vector A1 indicated in positioning vector information 268a with a positioning vector A2 indicated in positioning vector information 268b, and generates combined vector information 270 indicating a combined vector B (refer to FIG. 8).

The terminal control section 200 stores the generated combined vector information 270 in the terminal second storage section 250.

As shown in FIG. 6, the terminal 40 stores a positioning position information selecting program 226. The positioning position information selecting program 226 is a program for the terminal control section 200 to select one of positioning position information 256a or the like, based on positioning vector information 258 and combined vector information 270. That is, the positioning position information selecting program 226 and the terminal control section 200 are, as a whole, an example of current position information selecting means.

Specifically, the terminal control section 200 selects positioning position information 256a or the like that corresponds to positioning vector information 258a having the largest correlativity with combined vector information 270. The large correlativity used here implies that direction and speed deviation is small between comparative combined vector information 270 and positioning vector information 258a or the like. For example, from among the positioning vectors "a," "b," and "c" (refer to FIG. 7), the positioning vector "a" and the combined vector B have the smallest deviation in both of the direction and speed. Thus, the terminal control section 200 selects positioning position information 256a that corresponds to the positioning vector "a."

The terminal control section 200 stores the selected positioning position information 256a as output purpose position information 272 in the terminal second storage section 250.

In addition, the terminal control section 200 is designed to select positioning position information 256c that corresponds to the positioning vector "c" indicating the slowest passing speed in the case where combined vector information 270 indicates that the terminal 40 has stopped, i.e., in the case where a speed indicated in the combined vector information 270 is zero (0).

As shown in FIG. 6, the terminal 40 stores an output purpose position information display program 228 in the terminal first storage section 210. The output purpose position information display program 228 is a program for the terminal control section 200 to display output purpose position information 272 on the display section 54.

The positioning system 10 is configured as described above.

As described above, the terminal 40 can generate positioning vector information 258 based on a signal S1 or the like used when positioning position information 256 (refer to FIG. 6) was generated. As described above, the terminal 40 uses positioning vector information 258 as basic information for selecting positioning position information 256.

In addition, the terminal 40 can generate positioning vector information 268 indicating a passing direction and a passing speed of the terminal 40 with respect to each of the base stations 20A or the like. The positioning vector information 268 is information indicating a relative passing direction and a passing speed of the terminal 40 with respect to each of the base stations 20A and the like.

In addition, the terminal 40 can generate combined speed vector information 270 indicating a passing direction and a passing speed of the terminal 40, based on a plurality of speed vector information 268a or the like.

Further, the terminal 40 can selects one of positioning position information 256a or the like that corresponds to positioning vector information 258a or the like having the largest correlativity with combined vector information 270.

A passing direction for configuring speed vector information 258a is based on transmitting direction information 152h or the like (refer to FIG. 5) included in a communication signal CS1 or the like from each of the base stations 20A and the like situated at fixed positions. In addition, each of the base stations 20A or the like are situated at the fixed positions, and thus, the passing speed indicated in the speed vector information 258a or the like reflects only the passing speed of the terminal 40. Thus, in a course of generating positioning vector information 258a or the like, the only factor of an error is the passing speed of the terminal 40. Therefore, it can be said that the speed vector information 258a or the like is highly precise. In addition, the combined vector information 270 is highly precise because it is the information generated based on the speed vector information 258a or the like.

Therefore, the positioning vector information 258a or the like having large correlativity with the combined vector information 270 is higher in precision than the positioning vector information 258a or the like having small correlativity with the combined vector information 270.

This implies that a receiving state of a signal S1 or the like was good, the signal being used when the positioning vector information 258a or the like having large correlativity with the combined vector information 270 has been generated. In addition, the precision is high if the positioning is based on the signal S1 or the like in the case where the receiving state is good. Thus, it can be said that the positioning position information 256a or the like is highly precise, the information being generated based on the signal S1 or the like when the positioning vector information 258a or the like having large correlativity with the combined vector information 270 was generated.

This implies that a receiving state of a signal S1 or the like was good, the signal being used when the positioning vector information 258a or the like having large correlativity with the combined vector information 270. In addition, the precision is high if the positioning is based on the signal S1 or the like in the case where the receiving state is good. Thus, it can be said that the positioning position information 256a or the like is highly precise, the information being generated based on the signal S1 or the like used for the positioning vector information 258a or the like approximate to the combined vector information 270.

In this regard, the terminal 40 can select one of the positioning position information 256a or the like with high precision reflecting the passing state of the terminal 40 because it selects one of the positioning position information 256a or the like that corresponds to the positioning vector information 258a or the like having the largest correlativity with the combined vector information 270.

In this manner, according to the positioning system 10, it is possible to select a positioning location with high precision that corresponds to the passing state of the terminal 40.

In particular, the terminal 40 can reliably select a positioning location that corresponding to the passing state of the terminal 40 because it can select the positioning position information 256a or the like that corresponds to the positioning vector information 258a or the like having the largest correlativity with the combined vector information 270.

Further, the terminal 40 can select one of the positioning position information 256a or the like that corresponds to the positioning vector information 258 indicating the slowest passing speed in the case where the combined vector 270 indicates that the terminal 40 has stopped. Thus, it is possible to prevent selection of one of the positioning position information 256a or the like that corresponds to the positioning vector information 258 indicating that the terminal 40 moves at a high speed in spite of the fact that the terminal has stopped.

Unlike the present embodiment, the terminal 40 may be configured to reselect the previously selected positioning position information 256a or the like in the case where the combined vector information 270 indicates that the terminal 40 has stopped. In this manner, it is possible to prevent selection of the positioning position information 256a or the like indicating a position different from the position indicated in the previously selected positioning position information 256a or the like in spite of the fact that the terminal 40 has stopped.

The description of the configuration of the terminal 40 according to the present embodiment has now been completed. Hereinafter, an example of an operation will be described mainly with reference to FIG. 9.

Figure 9:
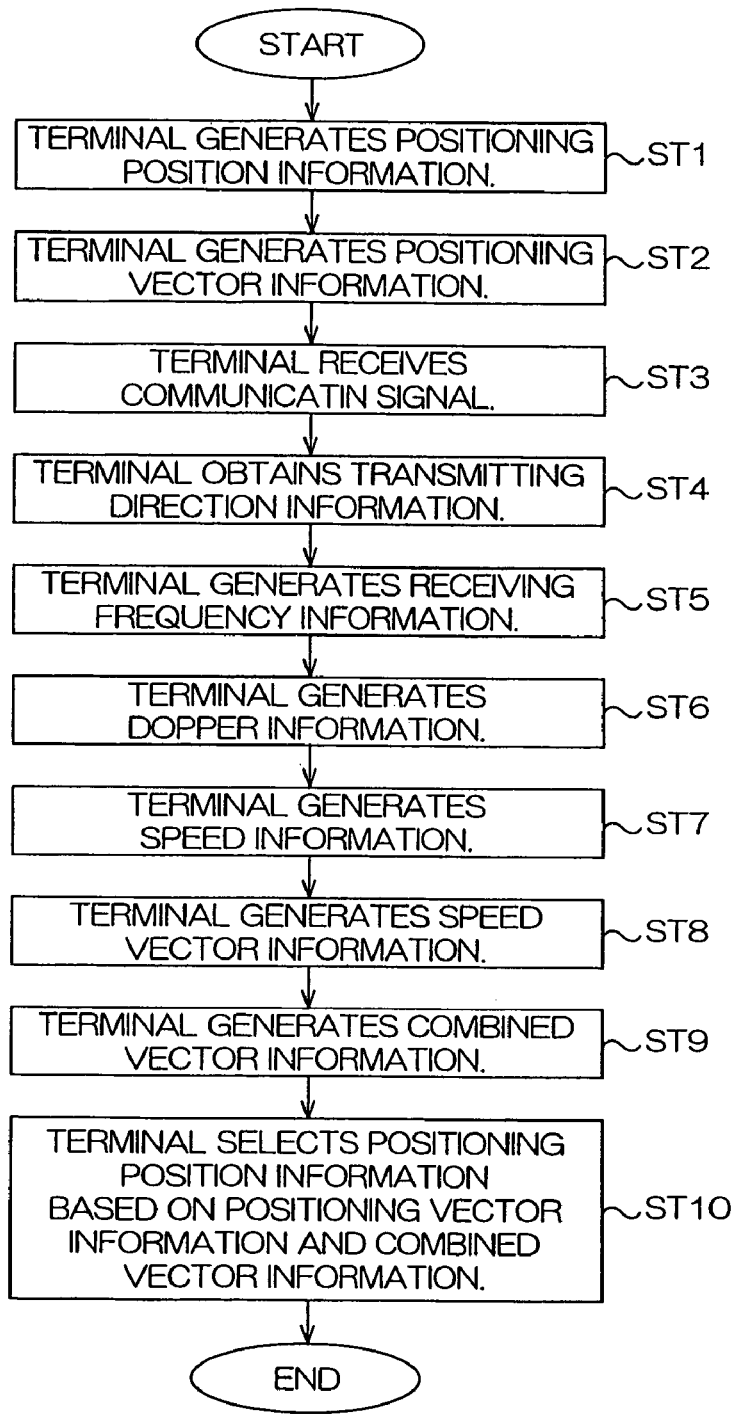
FIG. 9 is a schematic flow chart showing an example of an operation of a positioning system.

FIG. 9 is a schematic flow chart showing an example of an operation of the terminal 40 according to the present embodiment.

First, the terminal 40 receives a signal S1 or the like from a GPS satellite 12a or the like, and generates a plurality of positioning position information 256a or the like (refer to FIG. 6) based on the signal S1 or the like (step ST1 of FIG. 9). The step ST1 is an example of a step of generating the current position information.

Next, the terminal 40 generates positioning vector information 258a or the like (step ST2). The step ST2 is an example of a step of generating a positioning vector information.

Then, the terminal 40 receives a communication signal CS1 or the like (refer to FIG. 5) (step ST3). The step ST3 is an example of a step of receiving a communication signal.

Then, the terminal 40 obtains transmitting direction information 152 (refer to FIG. 4) included in the communication signal CS1 or the like (step ST4). The step ST4 is an example of a step of obtaining a transmitting direction information.

Then, the terminal 40 generates receiving frequency information 262 (step ST5). The step ST5 is an example of a step of generating the receiving frequency information.

Then, the terminal 40 generates Doppler information 264 (step ST6). The step ST6 is an example of a step of generating a Doppler shift information.

Then, the terminal 40 generates speed information 266 by using base station transmitting frequency information 254 and the Doppler information 264 (step ST7). The step ST7 is an example of a step of generating a passing speed information.

Then, the terminal 40 generates speed vector information 268 (refer to FIG. 6 and FIG. 8) indicating a speed vector A1 or the like by using terminal side transmitting direction information 260 and the speed information 266. This step ST8 is an example of a step of generating a speed vector information.

Then, the terminal 40 combines positioning vectors A1 or the like indicated in a plurality of positioning vector information 268a or the like, and generates combined vector information 270 indicating a combined vector B (refer to FIG. 6 and FIG. 8) (step ST9). The step ST9 is an example of a step of generating a combined vector information.

Then, the terminal 40 selects one of positioning position information 256a or the like by using positioning vector information 258 and the combined vector information 270, and stores output purpose position information 272 in a terminal second storage section 250 (step ST10). The step ST10 is an example of a step of selecting a current position information.

As has been described above, according to the positioning system 10, it is possible to select a positioning position with high precision that corresponds to the passing state of the terminal 40.

Program and Computer Readable Recording Medium or the Like

A terminal apparatus control program can be provided, the program being adapted to cause a computer to execute the steps of generating current position information, generating positioning vector information, receiving a communication signal, obtaining a transmitting direction information, generating receiving frequency information, generating Doppler shift information, generating passing speed information, generating speed vector information, generating combined vector information, selecting current position information or the like, which are shown as examples of operation described above.

In addition, a computer readable recording medium or the like can be provided, the recording medium having such a terminal apparatus control program or the like recorded therein.

Program storage mediums used to install these terminal apparatus control programs or the like in a computer and to establish a computer executable state include: a semiconductor memory, a magnetic disk, or a magneto-optical disk having programs temporarily or permanently stored therein as well as flexible disks such as a floppy disk (registered trademark) and package mediums such as CD-ROM (Compact Disc Read Only Memory), CD-R (Compact Disc-Recordable), CD-RW (Compact Disk-Rewritable), and DVD (Digital Versatile Disc).

The invention is not limited to the above described embodiments. Further, the above described embodiments may be configured by combining them with each other.

What is claimed is:

1. A positioning system comprising:
   a terminal apparatus; and
   a plurality of communication base stations that are communicable with the terminal apparatus and that are situated at fixed positions,
   each of a plurality of the communication base station having a communication signal transmitting section that transmits a communication signal including transmitting direction information that indicates a transmitting direction at a given transmitting frequency,
   the terminal apparatus having
      a positioning section that positions a plurality of current position candidates based on combinations of different satellite signals, a positioning vector calculation section that calculates a plurality of positioning vectors that indicates a passing direction and a passing speed of the terminal apparatus, based on each of the combinations of different satellite signals, a transmitting direction information obtaining section that receives the communication signal from a communication base station among the plurality of communication base stations and obtains the transmitting direction information transmitted by the communication signal, a Doppler shift calculation section that calculates a Doppler shift of the received communication signal from receiving frequency when receiving the communication signal and the transmitting frequency, a speed vector calculation section that calculates a speed vector that indicates a passing direction and a passing speed of the terminal apparatus with respect to each of a plurality of the communication base stations, based on the Doppler shift, the given transmitting frequency, and the transmitting direction information, a combined vector calculating section that calculates a combined vector by combining the speed vectors calculated by the speed vector calculation, and a current position selecting output section that selects one positioning vector that has the correlation with the combined vector from the positioning vectors calculated, selects a current position candidate corresponding to the one positioning vector from a plurality of the current position candidates, and outputs the selected current position candidate.

2. A terminal apparatus communicable with a communication base station having a communication signal transmitting section that transmits a communication signal including transmitting direction information that indicates a transmitting direction at a given transmitting frequency, the terminal apparatus comprising:

a positioning section that positions a plurality of current position candidates based on combinations of different satellite signals;

a position vector calculation section that calculates a plurality of positioning vector that indicates a passing direction and a passing speed of the terminal apparatus, based on the each of the combinations of different satellite signals;

a transmitting direction information obtaining section that receives the communication signal from a communication base station among the plurality of communication base stations and obtains the transmitting direction information transmitted by the communication signal;

a Doppler shift calculation section that calculates Doppler shift of the received communication signal from a receiving frequency when receiving when receiving the communication signal and given transmitting frequency;

a speed vector calculation section that calculates speed vector that indicates a passing direction and a passing speed of the terminal apparatus with respect to each of the plurality of communication base stations, based on the Doppler shift, the given transmitting frequency, and the transmitting direction information;

a combined vector calculation section that calculates a combined vector by combining the speed vectors calculated by the speed vector information; and a current position selection output section that selects one positioning vector that has the correlation with the combined vector from the positioning vectors calculated, selects a current position candidate corresponding to the one positioning vector from a plurality of the current position candidates, and outputs the selected current position candidate.

3. The terminal apparatus according to claim 2, wherein the current position selection output section selects the position vector that has the largest correlativity with the combined vector, selects a current position candidate that corresponds to the selected position vector from the plurality of current position candidates, and outputs the selected current position candidate.

4. The A terminal apparatus according to claim 2, wherein the current position selection output section selects a positioning vector that indicates the slowest passing speed from a plurality of position vectors calculated by the positioning vector calculation section in the case where the combined vector information indicates that the terminal apparatus has stopped, selects a current position candidate that corresponds to the selected position vector from a ;plurality of the current position candidates, and outputs the selected current position candidate.

5. The terminal apparatus according to claim 2, wherein the current position selection output section reselects the previously selected current position candidate in the case where the combined vector indicates that the terminal apparatus has stopped.

6. A method of controlling a terminal apparatus communicable with a communication base station having a communication signal transmitting section that transmits a communication signal including transmitting direction information that indicates a transmitting direction at a given transmitting frequency, the method, comprising:

positioning a plurality of current position candidates based on combinations of different satellite signals;

calculating a plurality of current position vectors that indicate a passing direction and a passing speed of the terminal apparatus, based on each of the combinations of different satellite signals;

receiving the communication signal and obtaining the transmitting direction information transmitted by the communication signal;

calculating Doppler shift of the received communication signal from a receiving frequency when receiving the communication signal and the given transmitting frequency;

calculating speed vector that indicates a passing direction and a passing speed of the terminal apparatus with respect to each of a plurality of communication base stations, based on the Doppler shift, the given transmitting frequency, and the transmitting direction information;

combining each of the speed vectors and calculating the combined vectors; and selecting one position vector that has the correlation with the combined vector from a plurality of positioning vectors that have been calculated, selecting a current position candidate corresponding to the one positioning vector from a plurality of the current position candidates, and outputting the selected current position candidate.

7. A control program that is executed by a computer that is included in a terminal apparatus communicable with a communication bases station having a communication signal transmitting section that transmits a communication signal including transmitting direction information that indicates a transmitting direction at a given transmitting frequency, the program causing the computer to execute instructions comprising:

positioning a plurality of current position candidates based on combinations of different satellite signals;

calculating positioning vectors that indicate a passing direction and a passing speed of the terminal apparatus, based on each of the combination of different satellite signals;

receiving the communication signal and obtaining the transmitting direction information transmitted by the communication signal;

calculating Doppler shift of the received communication signal from a receiving frequency when receiving the communication signal and the given transmitting frequency;

calculating a speed vector that indicates a passing direction and a passing speed of the terminal apparatus with respect to each of the communication base stations, based on the Doppler shift, the given transmitting frequency, and the transmitting direction information;

combining each of the speed vectors and calculating the combined vectors; and selecting one position vector that has the correlation with the combined vector from the calculated positioning vectors, selecting a current position candidate corresponding to the one positioning vector from a plurality of the current position candidates, and outputting the selected current position candidate.

8. The positioning system according to claim 1, wherein the communication signal transmitting section of the communication bases station transmits the communication signals including the transmitting direction information in all directions.

* * * * *